Jan. 22, 1963 W. E. MULLINS 3,074,554
SCREEN
Filed Sept. 11, 1958 2 Sheets-Sheet 1
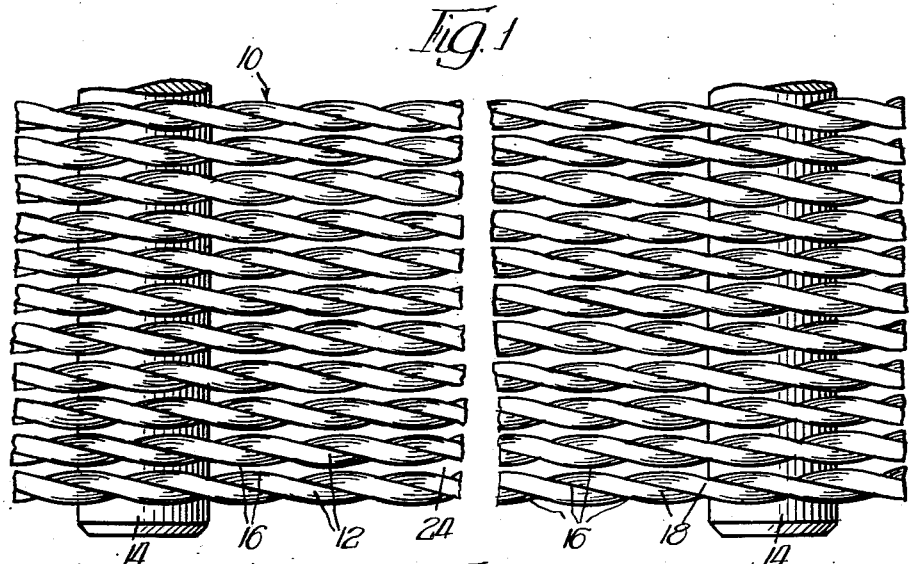
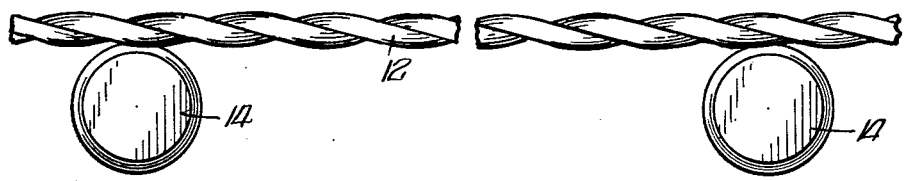
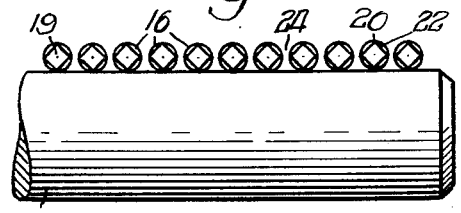
INVENTOR.
William E. Mullins,
BY
Byron, Hume, Groen + Clement
Attys.

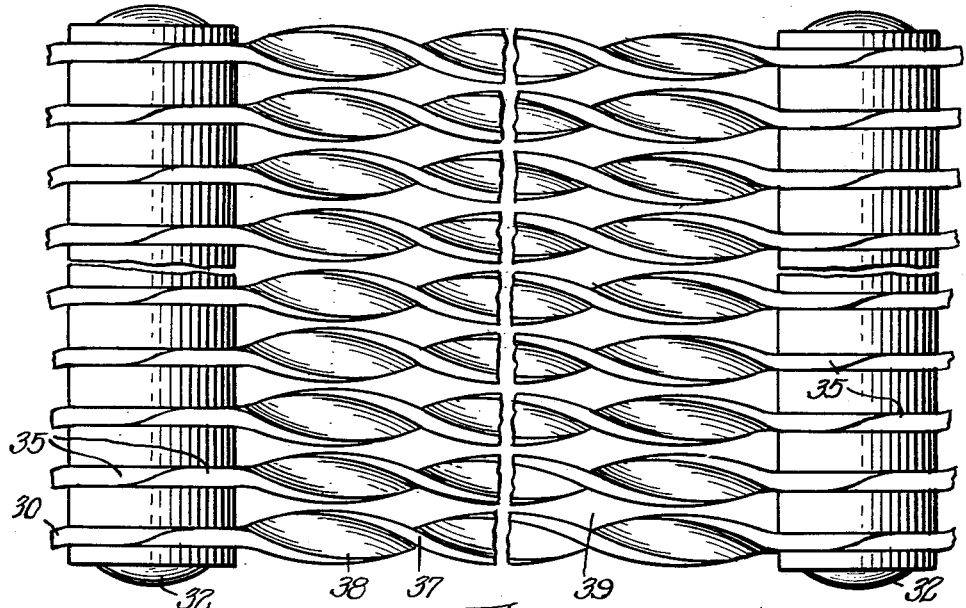
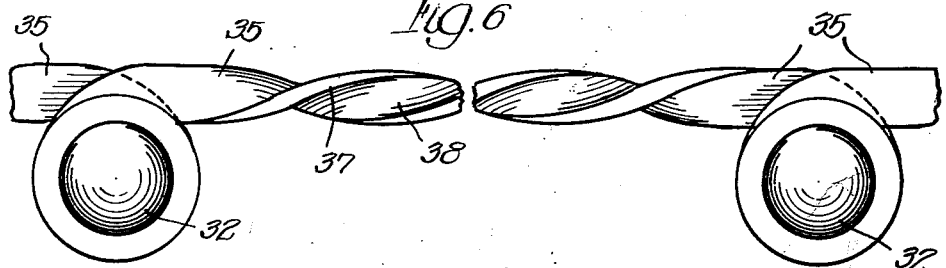
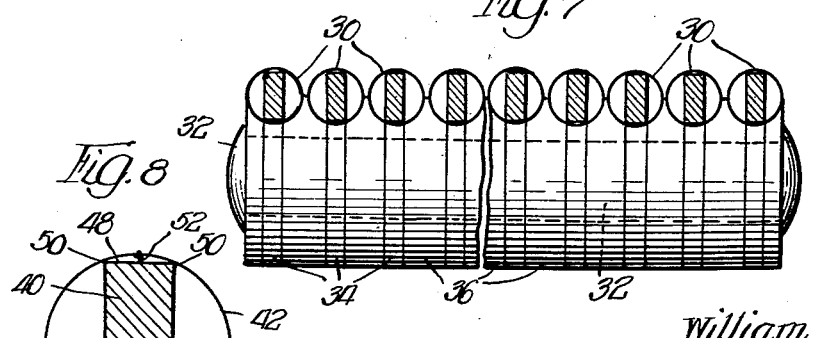

3,074,554
SCREEN
William E. Mullins, Chester, Ill., assignor to Bixby-Zimmer Engineering Company, Galesburg, Ill., a partnership
Filed Sept. 11, 1958, Ser. No. 760,481
6 Claims. (Cl. 209—393)

This invention pertains to screens and other similar structures and in particular to a screen especially suited for the sorting and grading of solids and including the separation of liquids from solids.

The technological advance of methods of processing and manufacturing has required greater efficiency in the sorting of commodities, including the sizing of solids and the separation of liquids from solids, in numerous fields, such as mining, smelting, chemical, foods, and the like. Most of the liquid and solids separations are done on screen surfaces as used in machinery such as vibrating screens, trommels, filters, and the like. These screen surfaces are of numerous types and include woven wire, punched plate, assembled rods, welded wire or rods, and the like, arranged to produce square, round, rectangular, and various other shaped slots of a predetermined size, to allow liquids and solids to pass therethrough.

It has been found that many times the fines of certain solid materials, such as minerals, tend to clump and/or to adhere to the larger particles which are to be retained on the screen. These small particles are extremely difficult, if not impossible, to separate from the larger particles when they have clumped or adhered to the larger particles. In fact, conventional and heretofore known screens and screening equipment are relatively ineffective with regard to fines when they have clumped or adhered to larger particles. This problem is further enhanced when the solid material is damp or wet. Moreover, if it is desired to remove the water or other liquid adhering to the solid particles, it has been found that most conventional or heretofore known screens are relatively ineffective for this type of separation.

For these reasons among others I have invented a screen in which the foremost feature and object is the use of rods which are twisted or threaded in the construction of the screens. These rods may be characterized as having one or more helical or spiral crests which extend substantially the full length of the rod. When these rods are used in conjunction with other like rods, they form a screen having a plurality of variable openings. The helical crests tend to direct the aforementioned fines and liquids to the variable openings as will be described more fully hereinafter.

Another object of the invention resides in the provision of the screen that is designed to scrape or otherwise remove particles and liquids that tend to adhere to the material to be retained on the screen.

Another object of the invention resides in the provision of the screen that is especially suited for the separation of liquids and fine particles from the larger particles to be retained on the screen. These and other objects of the invention will be apparent upon the reading of the specification with reference to the following drawings.

In the drawings:

FIGURE 1 is a plan view in elevation of one form of the screen embodying the invention.

FIGURE 2 is a side view in elevation of the screen shown in FIGURE 1.

FIGURE 3 is an end view in elevation showing the cross-section of the rods used in the construction of the screen.

FIGURE 4 is an end view in elevation showing a modified form of the rods used in the construction of the screen.

FIGURE 5 is a plan view in elevation of the second form of the screen embodying the invention.

FIGURE 6 is a side view in elevation of the screen shown in FIGURE 5.

FIGURE 7 is an end view of the screen shown in FIGURE 5 showing the cross-section of the rods used in the construction of the screen.

FIGURE 8 is a diagrammatic illustration in detail of one of the rods used in the construction of the screen shown in FIGURE 5.

The arbitrary names of rods and crossbars have been selected for two of the elements used in the construction of the screen embodying the invention. It is to be understood that these names are not to be construed as limitations as to the size and character of these elements and that the dimensions may be varied to suit the particular application.

Referring now to FIGURE 1, there is shown one form of the screen embodying the invention, generally denoted by the numeral 10. The screen 10 is composed of a plurality of small rods 12 which extend lengthwise of the screen section. Generally the rods 12 are mounted in the direction in which the material moves over the screen. These rods 12 are maintained in a closely spaced relationship by the crossbars 14 which in turn are adapted to be received in a supporting frame of the screening machinery (not shown). The rods 12 may be secured to the crossbars 14 by any suitable means such as welding, soldering, brazing, tying, or by mechanical means such as screws, clips, or other methods. The crossbars 14 can be of any size or shape or spacing necessary to the particular application.

Referring now to FIGURES 1 and 2, it will be noticed that the rods 12 have the appearance of being threaded, and are characterized by the helical crests 16 and roots 18. In this particular embodiment the helices are of a relatively long pitch as compared to the thread of a screw or bolt. However, the pitch of the rods may be varied to fit the particular application.

The helical effect may be accomplished in any one of several ways. One method which is particularly suitable for this application is the twisting of rods having a polygonal or acircular cross-section such as square, rectangular, triangular, to various pitches. It should be kept in mind that substantially all rods which have an acircular cross-section may be used in the practice of the invention. For example, this would include rods having elliptical cross-sections as well as those having sides such as rectangular and triangular.

Referring now to FIGURE 3, there is shown an end view of the screen shown in FIGURE 1 composed of one type of rods. These rods are substantially square in cross-section and have been twisted or otherwise formed so as to have a helical crest and root as shown in FIGURES 1 and 2. It should be understood that the helical configuration can be formed by forming operations other than twisting, such as rolling or pressing. As can be seen in FIGURE 3, the crests 16 are formed by the corners 20 of the square cross-section, and the roots 18 by the midpoint of each of the sides 22. The rods 19 have been so spaced that the circumference of the helix which is actually the circumference of the crest 16 is in closely spaced relationship. As mentioned previously, the spacing depends in a large measure upon the particular application in which the screen is to be used.

By referring back to FIGURE 1, it will be noticed that the spaces between the rods 12 are varied. This variation is the result of the previously described helical crests and roots. In this particular embodiment the rods are so spaced in a longitudinal direction that corresponding crests and roots of all the rods are in substantially the same circumferential position in any perpendicular plane bisecting the rods. As a result of this arrangement, the spaces 24 appear to be somewhat diamond-shaped. This effect is created in part by the co-operation of two crests 16 on adjacent rods 12 extending through the spaces 24 so that they would actually intersect if the rods were moved into touching relationship. This intersection causes the minimum spacing between the rods 12 as can be seen in FIGURE 1. The maximum spacing is caused by the co-operation of two roots 18 in the same manner. It should be pointed out that the magnitude and shape of the openings can be varied by adjusting the longitudinal position of the rods with respect to each other and that the arrangement shown in FIGURE 1 is merely by way of example. Moreover, it is not necessary that the rods be longitudinally positioned so that the crests correspond since the rods will form the variable spaces even though randomly positioned. While the materials being screened may tend to stick in the uniform slot openings of heretofore known and conventional screens, it has been found that the subject invention will relieve this condition. The diverging relief in all directions to the point of minimum space created by the adjacent crests of one rod to another permits the material being screened to fall freely through the openings.

It can now be seen that the helical crests provide the rods with a relatively rough surface or surfaces, as compared with conventional rods of circular cross-section which tends to scour off fine material and liquids clinging to the larger particles. These larger particles, as they are moved along the direction of the rods 12, are tumbled and mixed so that substantially all of the surfaces are brought into contact with the rods some time during the screening operation so as to scour off the fines. Furthermore, clusters of fine particles that might ordinarily pass over the conventional screen as a single particle or clump too large for the slot opening are broken into smaller sizes upon contact with the crests of the rods. It has been found that as the fine material is brought into contact with the crests, it is directed into the openings 24 by the helical configuration of the crests. This results in a much more complete separation of the fine material from the larger particles than heretofore possible with conventional or heretofore known screens.

A still further effect of the helical rods with respect to the removal of liquids should be kept in mind. The crests of the rod when brought into contact with the particles tend to break the surface tension of the liquids adhering to the particle surface. This would, of course, cause some natural migration of the liquid onto the rod which in turn due to the aforementioned helical effect would direct the liquid through the openings between the rods. As a result it has been found that this type of screen results in a more efficient separation of liquid from solid material than heretofore possible.

Referring now to FIGURE 4, there is shown an end view of a screen which is constructed in substantially the same manner as that shown in FIGURES 1-3. A major difference in this instance is that the rods 12 have a triangular cross-section and are designated by the numeral 26. This particular construction when shown in a plan view would have substantially the same appearance as that shown in FIGURE 1. The relationship of the maximum space to the minimum space, however, might be somewhat different but it would still result in substantially diamond-shaped spaces between the rods.

Referring now to FIGURES 5 and 6, there is shown another modification of the screen embodying the invention. This embodiment includes the rods 30 which extend in substantially the same direction as the material passes over the screen. These rods have been mounted on the crossbars 32 in some suitable manner. In this particular embodiment the rods 30 have been mounted on the crossbars 32 by looping the rods 30 as shown in FIGURE 6. The loops 34 are formed in any suitable manner and then pressed in an axial direction so that the approaches 35 for each of the loops are in substantially the same plane, as can best be seen in FIGURE 5. Intermediate the loops 34 are the washers 36 which maintain the rods 30 in the desired spaced relationship. The ends of the crossbars 32 have been flattened or upset as shown in FIGURE 7 in order to maintain the rods 30 and washers 36 thereon. As can be seen in FIGURE 7, the rods 30 have a substantially rectangular cross-section. Each of the rods has been provided with the helical crests 37 and roots 38 as shown in FIGURES 5 and 6. This helical construction may be formed at the same time that the loops 34 are pressed in the manner previously described. However, they may also be formed by twisting as previously described.

In this particular embodiment the diamond-shape of the openings 39 is extremely pronounced due to the use of the rectangular rods.

Referring now to FIGURE 8, there is shown a diagrammatic illustration of the cross-sectional view of the rod member which can be used to further understand the fundamentals of the invention. The rod member 40 is rectangular in shape and has been formed to have the helical configuration as previously described. The helix is represented by the circle 42 as shown in the drawing. It has been found that the maximum distance between the rods depends upon the length of the horizontal bisector 44 extending between the face 46 of the rod 40 and the circumference of the circle 42 when the rods are arranged longitudinally so that corresponding crests and roots are in substantially the same positions along any perpendicular plane. In fact, the maximum distance between any two adjacent rods is equal to twice the distance 44 plus the minimum distance which is equal to the space between two crests as they intersect between two adjacent rods. It should also be kept in mind that diamond-shaped openings will be formed by the sides 48 in co-operation with the corners 50. These diamond-shaped openings will be relatively negligible since the distance 52 between the sides 48 and the circumference of the circle 42 is relatively small. In fact, as the sides 48 approach zero length, the diamond-shaped configuration formed by these sides becomes negligible since the maximum and minimum distances between the circumference of the helix 42 and the corners 50, and the sides 48, respective'y, of adjacent rods approach equality. However, it should be kept in mind that there will always be some tendency toward a diamond-shaped configuration as long as the sides 48 remain a finite length so as not to be congruent with an arcuate segment of the circumference of the helix. In this manner it is possible to calculate the characteristics of screens formed from most types of rods. For example, if the rod were circular in cross-section, the distance between the surface of any part of the rod to the surface of the helix would be zero. Accordingly, the space between any two parallel rods would be substantially the same along the entire length of the rods. On the other hand, if the rods are elliptical in shape, the distance from the circumference of the ellipse at the major axis to the circumference of the helix would be zero. However, the distance from the circumference of the ellipse at the minor axis to the circumference of the helix would be some finite amount so that if the rod were twisted or otherwise helically formed, it would produce in co-operation with like rods the wavy or diamond-shaped opening previously described. It can now be seen that the invention may be practiced with all rods having an acircular cross-section, including an elliptical cross-section, except rods having a substantially circular cross-section.

Although the invention has been described in terms of screens composed of rods having helical crests, it is to be understood that such rods might be used in conjunction with conventional nonhelical rods. It can be seen that if a helical rod were positioned adjacent a conventional rod, they would co-operate to form a variable space and at the same time the helical rod would provide the beneficial characteristics of the helical crest.

Although certain embodiments of the invention have been disclosed herein, it is to be understood that these are merely by way of example, and are not to be considered in any manner as limitations. It is contemplated that certain modifications may be made within the scope of the claims without departing from the spirit of the invention.

What is claimed is:

1. A screen for classifying particles according to size and for separating a liquid from a solid in which the retained material travels across the screen surface in effecting the separation comprising a plurality of rod members maintained in a closely spaced substantially parallel relationship to define a substantially flat screen, said rod members extending in the direction of material travel across said screen, each of said rod members having at least one helical crest extending the length thereof whereby adjacent rod members cooperate to form a variable opening therebetween, said helical crest scraping the undersize and the liquid from the oversize as the latter travels over the screen and directing the undersize and liquid through the openings between said rod members.

2. A screen for classifying particles according to size and for separating a liquid from a solid in which the retained material travels across the screen surface in effecting the separation comprising a plurality of rod members being maintained in a closely spaced substantially parallel relationship to define a substantially flat screen and extending in the direction of material travel across said screen, said rod members each having at least one helical crest extending the length thereof and arranged so that corresponding helical crests on the rods are in the same circumferential position in any right section, said helical crests scraping the undersize and liquid from the oversize as the latter travel over the screen and directing the undersize and liquid in a generally helical path through the openings between said rod members.

3. A screen as defined in claim 2 in which said rod members have a triangular cross section.

4. A screen as defined in claim 2 in which said rod members have a rectangular cross section.

5. A screen as defined in claim 2 in which said rod members have an acircular cross section.

6. A screen for classifying particles according to size and for separating a liquid from a solid in which the retained material travels across the screen surface in effecting the separation comprising a plurality of rod members being maintained in a closely spaced substantially parallel relationship to define a substantially flat screen and extending in the direction of material travel across said screen, said rod members each having at least one helical crest extending the length thereof and arranged so that corresponding helical crests on the rods are in the same circumferential position in any right section, said helical crests scraping the undersize and liquid from the oversize as the latter travel over the screen and directing the undersize and liquid in a generally helical path through the openings between said rod members, and cross bars extending transversely of said rod members and secured to the same for maintaining them in the aforesaid closely spaced substantially parallel relationship.

References Cited in the file of this patent

UNITED STATES PATENTS

| | | |
|---|---|---|
| 1,020,073 | Bell | Mar. 12, 1912 |
| 1,414,132 | Hurrell | Apr. 25, 1922 |
| 1,620,846 | Wells | Mar. 15, 1927 |
| 2,585,719 | Alvord | Feb. 12, 1952 |

FOREIGN PATENTS

| | | |
|---|---|---|
| 363,810 | Italy | Oct. 13, 1938 |
| 627,225 | Germany | Mar. 11, 1936 |
| 922,154 | France | Dec. 18, 1945 |